March 28, 1967 J. DAUGHERTY 3,311,003

FACING HEAD ATTACHMENT AND DRIVE MECHANISM THEREFOR

Original Filed Feb. 14, 1964 8 Sheets-Sheet 1

INVENTOR.
JESSE DAUGHERTY
BY
Wolfe, Hubbard, Voit & Osann
ATTYS.

FACING HEAD ATTACHMENT AND DRIVE MECHANISM THEREFOR

Original Filed Feb. 14, 1964 8 Sheets-Sheet 2

INVENTOR.
JESSE DAUGHERTY
BY
Wolfe, Hubbard, Voit & Osann
ATTYS.

FACING HEAD ATTACHMENT AND DRIVE MECHANISM THEREFOR

INVENTOR
JESSE DAUGHERTY
BY
Wolfe, Hubbard, Voit & Osann
ATTYS.

INVENTOR.
JESSE DAUGHERTY
BY
Wolfe, Hubbard, Voit & Osann
ATTYS.

INVENTOR.
JESSE DAUGHERTY
BY
Wolfe, Hubbard, Voit & Osann
ATTYS.

FACING HEAD ATTACHMENT AND DRIVE MECHANISM THEREFOR

Original Filed Feb. 14, 1964 8 Sheets-Sheet 6

INVENTOR.
JESSE DAUGHERTY
BY
Wolfe, Hubbard, Voit & Osann
ATTYS.

FACING HEAD ATTACHMENT AND DRIVE MECHANISM THEREFOR

Original Filed Feb. 14, 1964

INVENTOR.
JESSE DAUGHERTY
BY
Wolfe, Hubbard, Voit & Osann
ATTYS.

FACING HEAD ATTACHMENT AND DRIVE MECHANISM THEREFOR

Original Filed Feb. 14, 1964 8 Sheets-Sheet 8

INVENTOR.
JESSE DAUGHERTY
BY
Wolfe, Hubbard, Voit & Osann
ATTYS.

United States Patent Office 3,311,003
Patented Mar. 28, 1967

3,311,003
FACING HEAD ATTACHMENT AND DRIVE MECHANISM THEREFOR

Jesse Daugherty, Fond du Lac, Wis., assignor to Giddings & Lewis Machine Tool Company, Fond du Lac, Wis., a corporation of Wisconsin Continuation of abandoned application Ser. No. 344,930, Feb. 14, 1964. This application Apr. 21, 1966, Ser. No. 544,314
7 Claims. (Cl. 82—2)

This is a continuation of application Ser. No. 344,930, filed Feb. 14, 1964, now abandoned, and entitled, "Facing Head Attachment and Drive Mechanism Therefor."

The present invention relates generally to machine tools, and more particularly to continuous feed facing head attachments and associated drive mechanisms for machine tools.

Facing head attachments are commonly employed to extend the work limits of a machine tool radially of its spindle to perform facing as well as a variety of other operations on workpieces without requiring the same to be moved substantially. Heretofore the practice has been to mount facing head attachments in fixed relation to the spindle sleeve, either on the sleeve itself, or on the spindle and driven from a separate gear. One of the serious limitations of said attachments is that they are carried in a fixed axial position, and are incapable of providing radial tool feed simultaneously with spindle feed, being limited to such operations as may be performed with the spindle fixed against axial movement.

The principal object of this invention is to provide a boring and facing head attachment for an extensible rotatable spindle, the attachment being so constructed as to provide a radial tool feed with the spindle in which it is carried extended to incrementally spaced positions from the supporting headstock, the radial tool feed thereby providing an additional positioning axis for the machine tool.

Another object is to provide a drive for the boring and facing head attachment which provides either incremental radial positioning of the tool or continuous radial feed movement of the tool while the spindle rotates for a turning cut.

A further object is to drive such a boring and facing head attachment through the spindle and independently of exterior connections to the headstock carrying the spindle, so that the attachment may be extended by the spindle as the latter is extended to axial positions spaced from the front of the headstock.

Another object of this invention is to provide position indicating means feeding back the radial position of a cutting tool on a facing head attachment to a numerical control system so as to permit automatic positioning of the tool on the facing head.

A further object of the present invention is to provide a facing head attachment and machine tool spindle, wherein the drive arrangement between the two is contained completely within the spindle and is rendered operative merely by insertion of the facing head attachment into the spindle so that the attachment may be transferred by automatic tool changing equipment in the same manner as other tools for the same machine are handled.

Objects and advantages of the invention not specifically set forth hereinabove will become more apparent from the description when taken in conjunction with the accompanying drawings, wherein.

Figures 3, 3A:
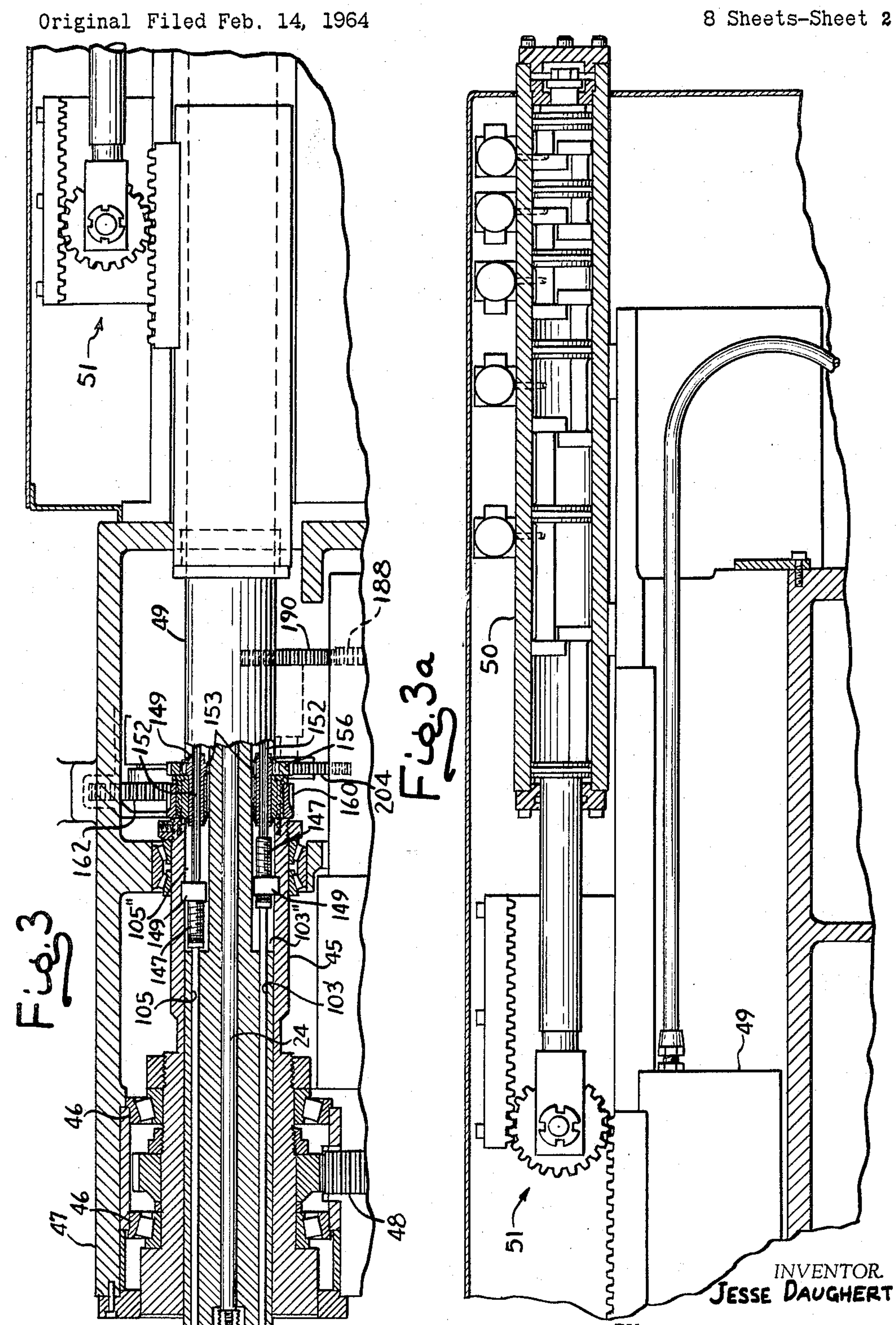
Figures 4, 5:
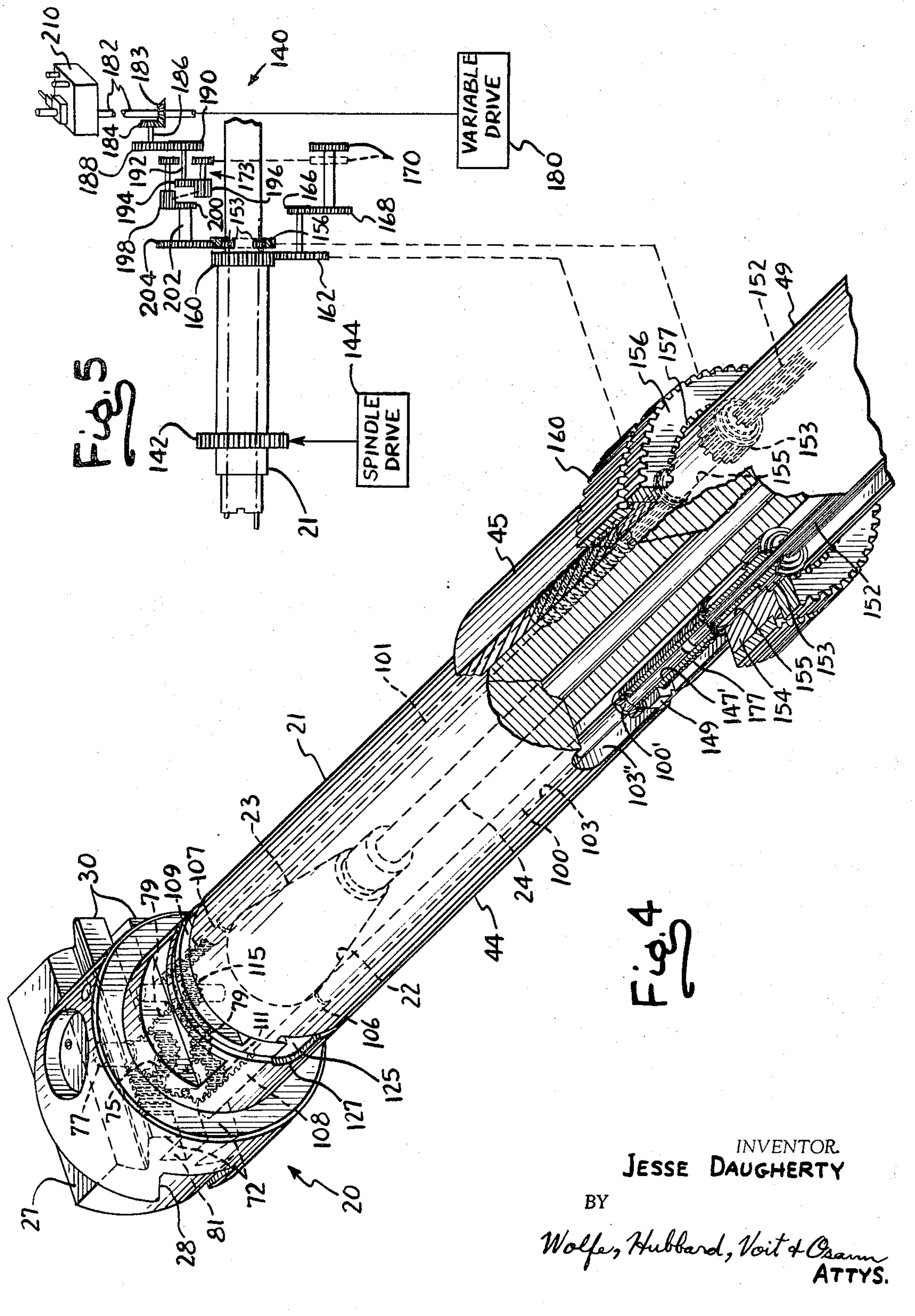
Figure 6:
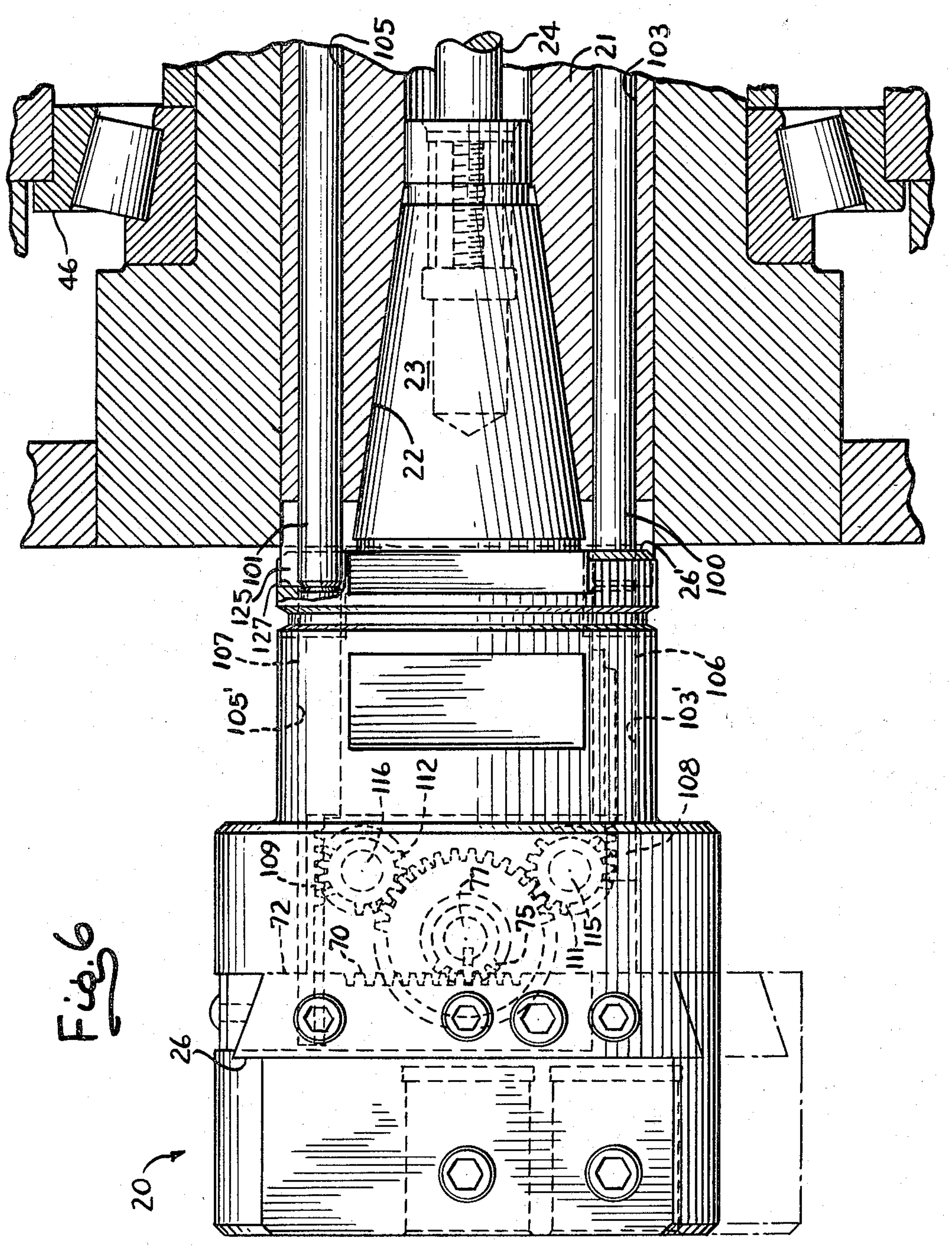
Figures 7, 8, 9:
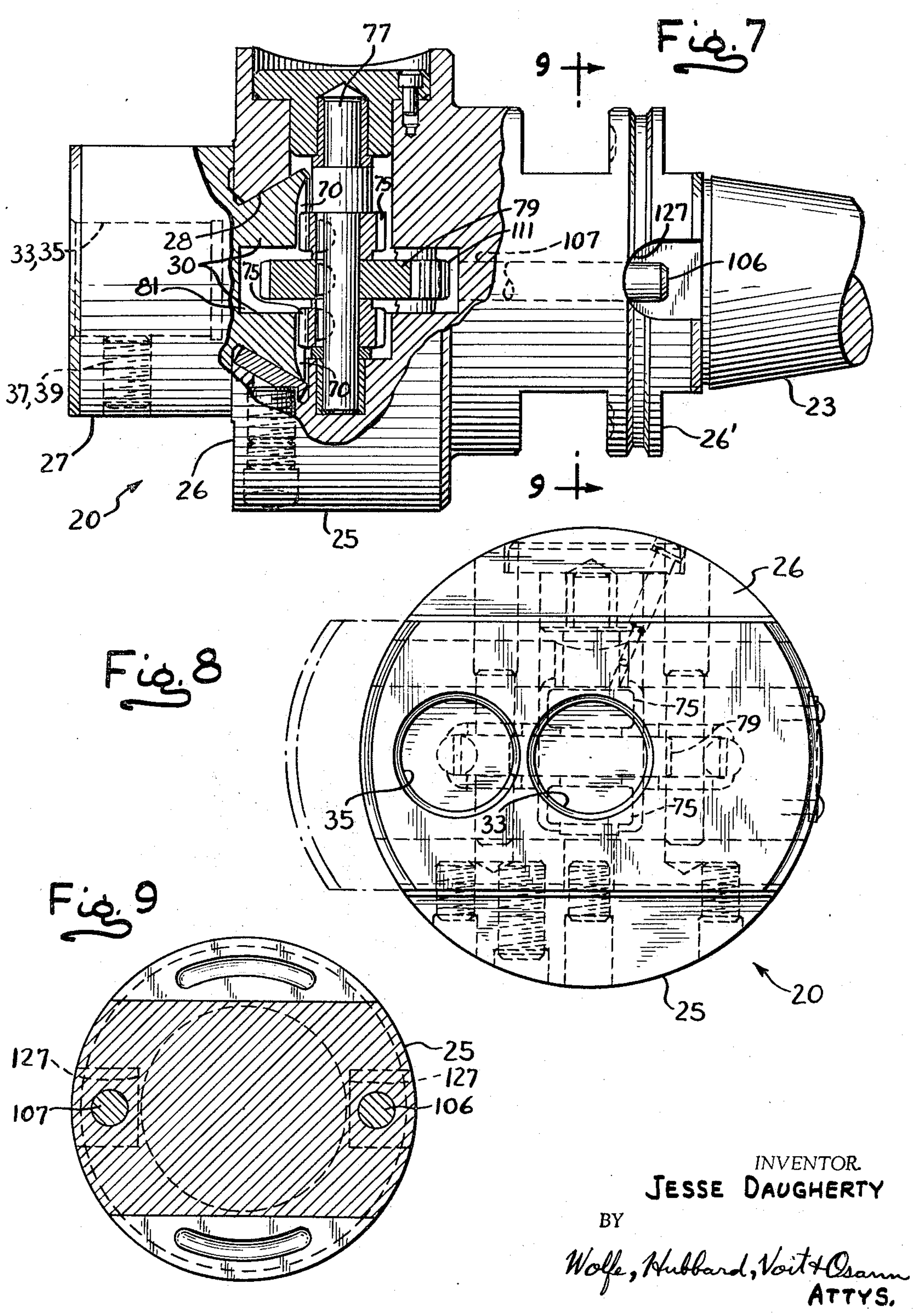
Figures 10, 13:
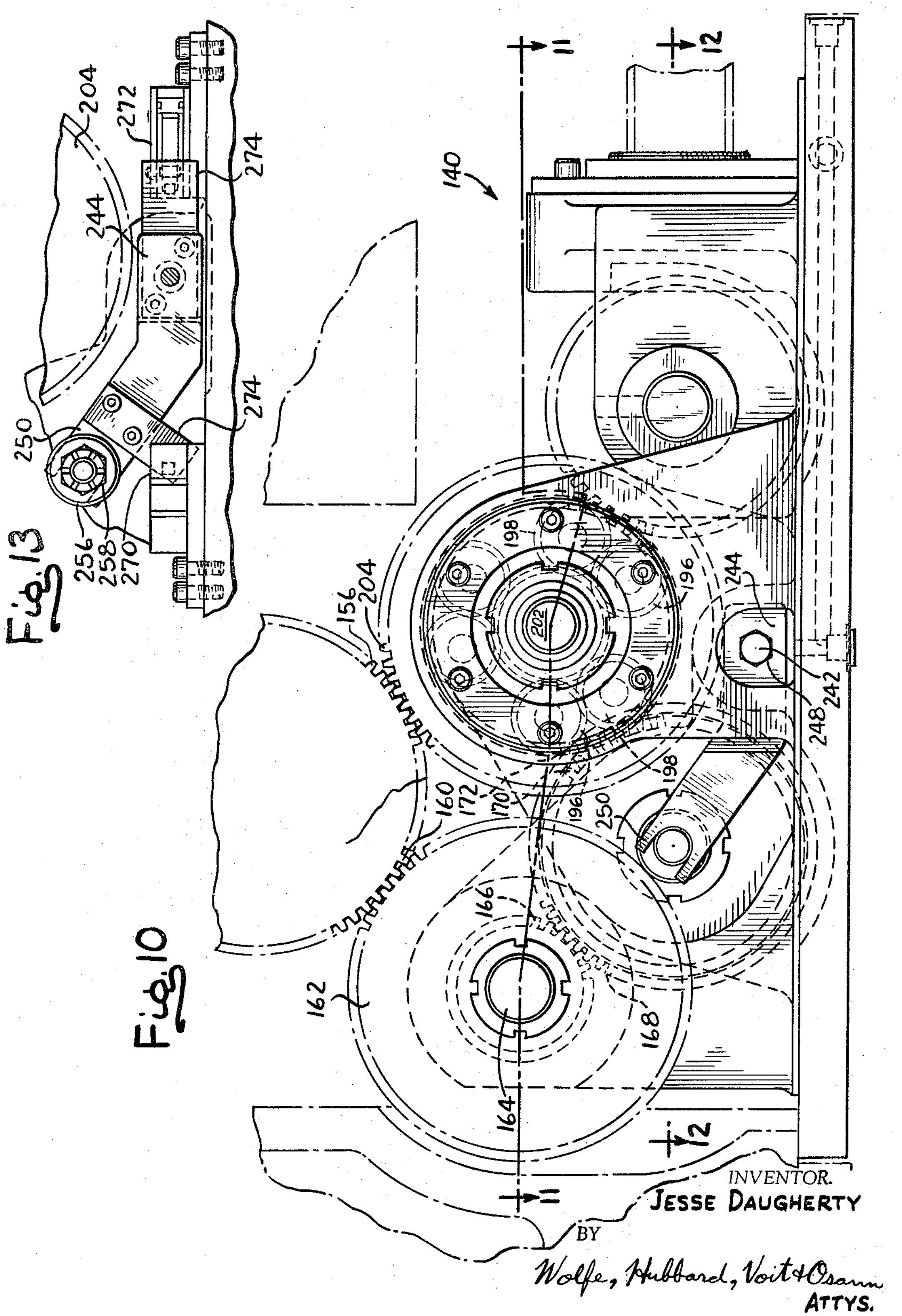
Figure 11:
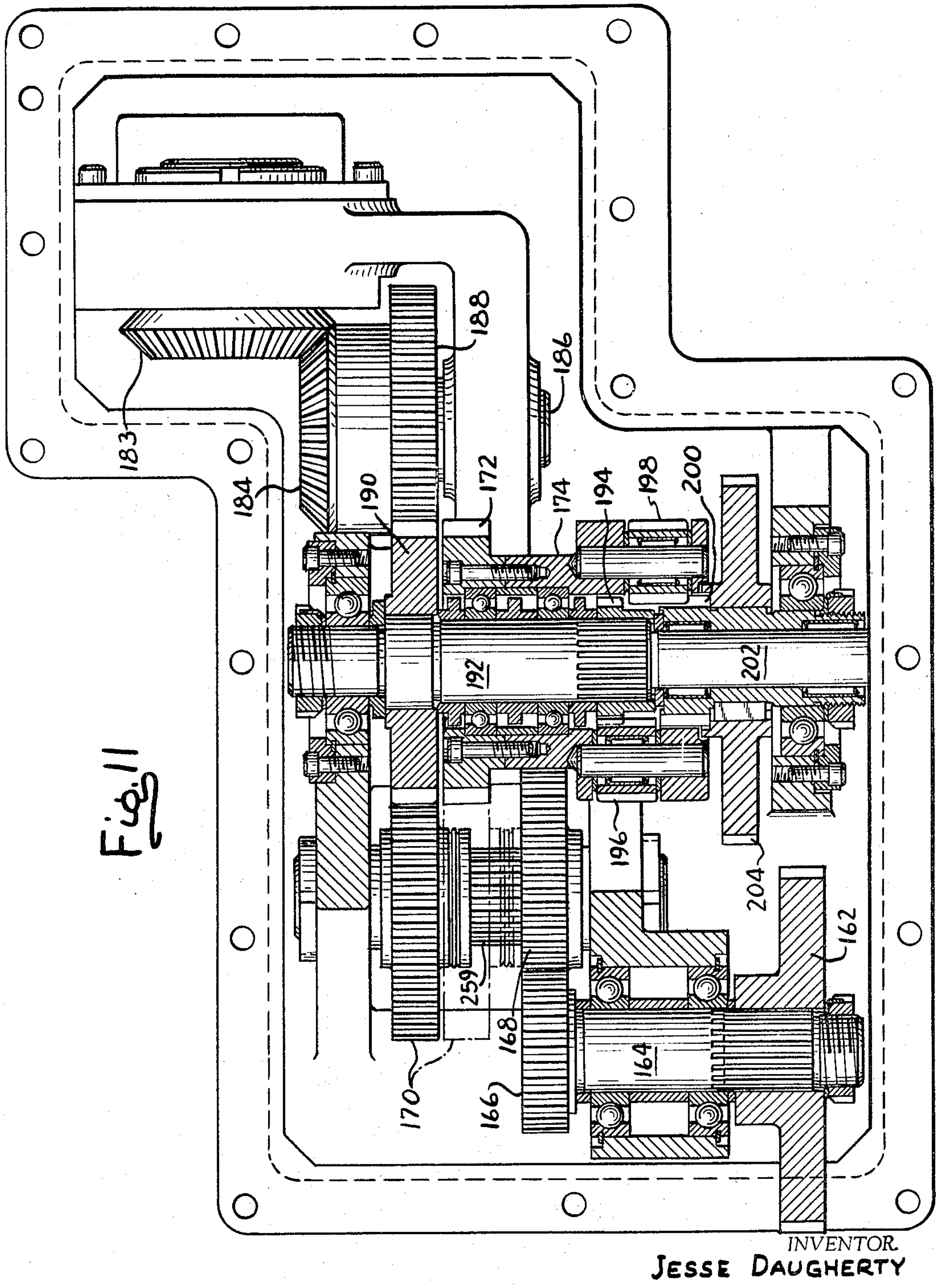
Figure 12:
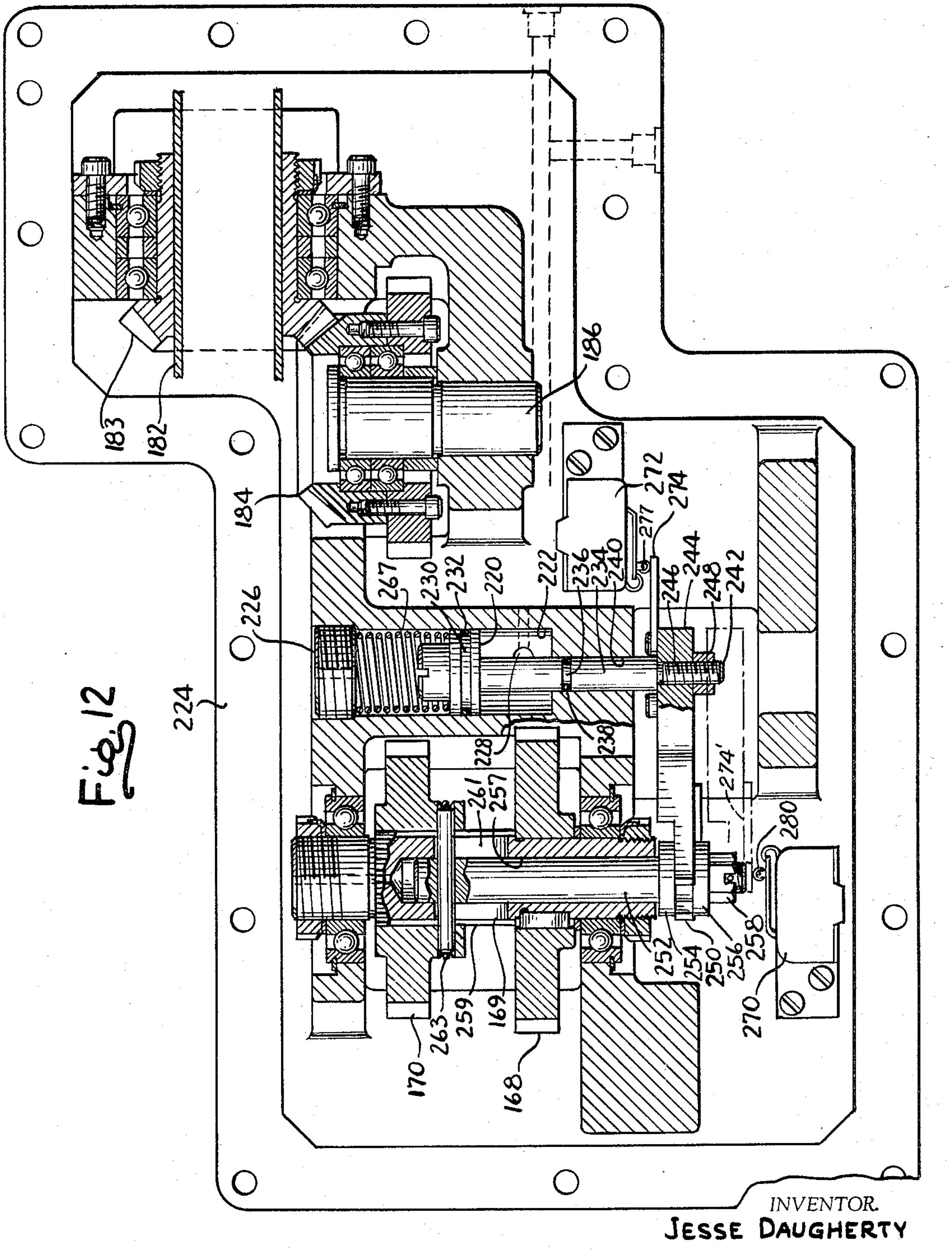

FIGS. 3 and 3*a*, taken together, are a vertical section through a spindle having drive means for the attachment;

FIG. 4 is a fragmentary perspective with parts shown in phantom of the spindle with the attachment mounted;

FIG. 5 is a schematic of the drive through the spindle for the attachment;

FIG. 6 is an enlarged elevation of the attachment with a fragment of the spindle mounting the same, in section;

FIG. 7 is an enlarged elevation of the attachment, partially sectioned;

FIG. 8 is a front elevation of the attachment;

FIG. 9 is a section along the lines 9—9 of FIG. 7;

FIG. 10 is an elevation of the feed transmission for operating the attachment drive which extends through the spindle;

FIG. 11 is a section taken along line 11—11 of FIG. 10;

FIG. 12 is a section taken along line 12—12 of FIG. 10; and

FIG. 13 is an enlarged elevation of the transmission shifting mechanism.

While a particular illustrative embodiment of the present invention has been shown in the drawings and will be described below in considerable detail, it is to be understood that there is no intention to limit the invention to the specific form disclosed. On the contrary, the intention is to cover all modifications, alternative constructions, equivalents and uses falling within the spirit and scope of the invention, as expressed in the appended claims.

Figures 1, 2:
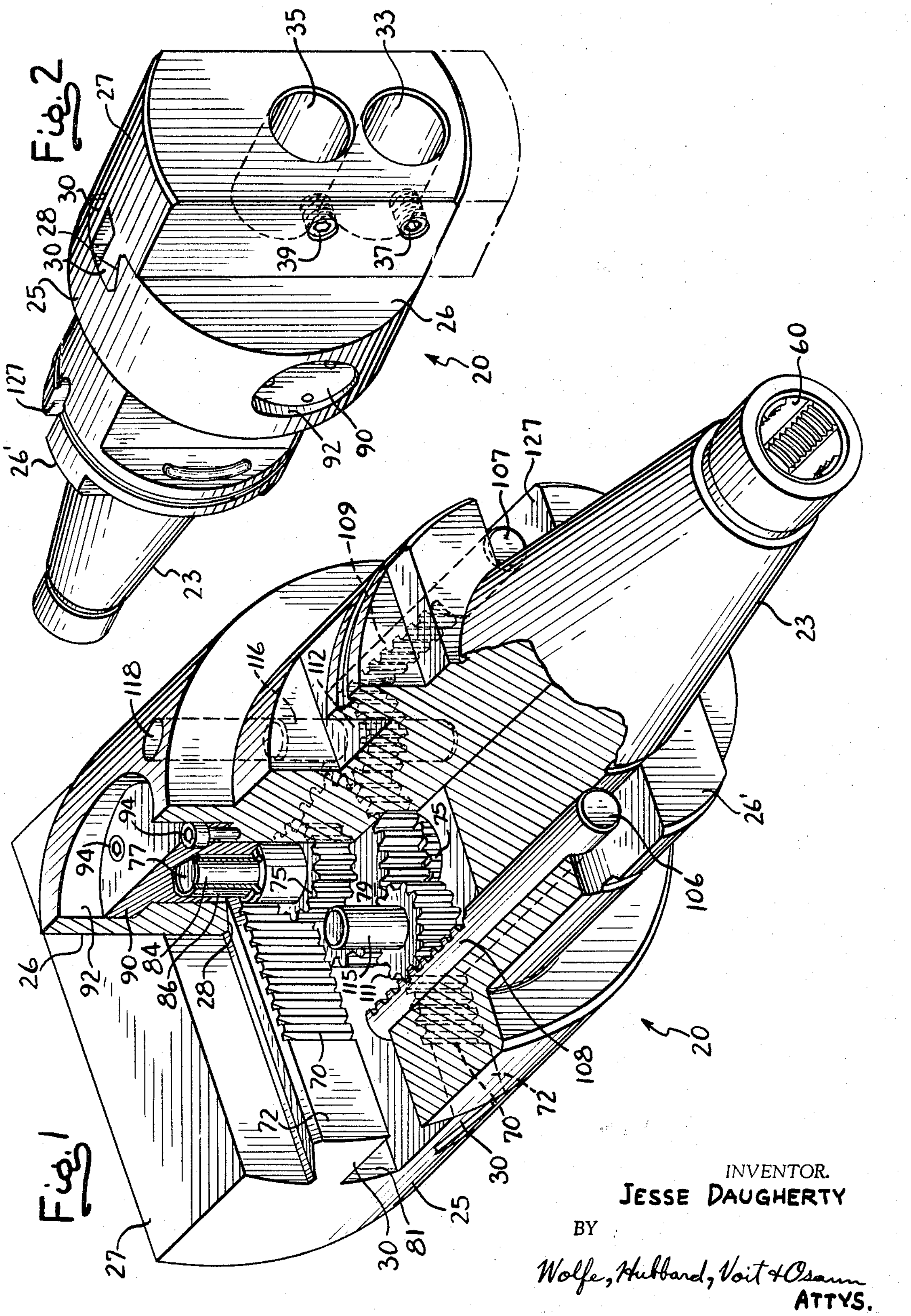
FIGURE 1 is a perspective with parts broken out of a facing head attachment constructed in accordance with the present invention.
FIG. 2 is a perspective taken from the front of the attachment.

Turning to the drawings, a facing head attachment 20 constructed according to this invention is shown in FIG. 1. The attachment 20 is adapted to be carried by a rotatable, extensible spindle 21, such as shown in FIGS. 3, 3*a*, and is depicted mounted on the forward end thereof, in the standard tapered socket 22 of such a spindle, in FIG. 4, the attachment being provided for this purpose with a tapered shank 23 fashioned to be rigidly and securely held in the spindle socket by means of a power drawbolt 24.

With particular reference to FIGS. 1 and 2, the boring and facing head attachment 20 of this invention comprises a body 25 of a generally cylindrical configuration, presenting a forward face 26 and rear face 26'. With the attachment 20 mounted in the spindle 21, the body 25 of the attachment will rotate upon rotation of the spindle, being rigidly secured therein by its shank 23. To provide for radial movement of a cutting tool relative to the spindle, the attachment is provided with a cross slide 27, received in a relatively deep diametral dovetailed slot 28 in the forward face 26 of the body 25, the tool slide 27 being slidably mounted for drive by means to be described hereinafter, by a pair of mating dovetailed runners 30. Associated wall portions of the runners 30 engage the walls of the slot 28 in bearing relation to permit sliding movement of the tool slide 27, the latter being provided with a pair of receptacles 33, 35 for receipt of an appropriate tool holder (not shown). The tool holder may be secured in the receptacles by means of set screws 37, 39, residing in threaded passages.

As shown in FIGS. 3 and 4, the spindle 21, which is constructed to receive the boring and facing attachment 20, comprises an elongated cylindrical bar 44 that is extensible and retractable within a sleeve 45 rotatably mounted by means such as bearings 46 in the headstock 47 of the machine tool. The headstock includes a spindle drive 48 connected to rotate the spindle sleeve 45, and thereby the spindle bar 44. To extend and retract the bar 44, the rearward end of the latter is connected to a ram 49 which is movable axially in the headstock by means herein shown as a series of hydraulic cylinder-piston units 50 for extending the bar 44 to incrementally spaced position of projection from the spindle sleeve 45. In this case the cylinder-piston units 50 are connected by a double rack and pinion drive 51 to the ram.

In accordance with the present invention, the boring and facing head attachment 20 is constructed to feed a cutting tool radially of the spindle, for machining purposes, at any position of translation of the spindle bar 44. For this purpose the drive to the cross slide 27 of the attachment 20 is through the spindle bar 44, and independent of any exterior connection to the spindle sleeve 45 or the headstock 47 itself. Moreover, the attachment can be positioned axially by extending the spindle bar 44, to any location required by the work configuration.

To this end, the tool slide drive is disposed internally of the facing head and comprises a gear transmission (FIGURE 1) which engages the teeth of racks 70, formed on the inner opposing surfaces 72 of the tool slide runners 30. The transmission includes a pair of rack pinions 75 which are keyed or otherwise nonrotatably disposed on a shaft 77. The pinions flank a main driving gear 79, which rotates freely in a slot 81, formed between the runners 30. The shaft 77 is provided with a reduced end portion 84, which is received in journal bearings 86 secured, in the case of the one shown in FIGURE 1, in a supporting flanged cap 90, which is fastened in countersunk bore 92 by means of Allenhead screws 94. One or more bores 92 permits convenient assembly of the drive transmission in the facing head which may otherwise be cast as a unitary part. A similar cap (not shown) may be provided on the opposite side of the facing head for greater ease in assembling the drive transmission.

Power to move the tool slide 27 in the slot 28 is transmitted to the slide, in accordance with the invention, by a drive directly through the spindle. The drive is operated by a feed transmission in the headstock, the arrangement being such that the power path through the spindle is unbroken upon translation of the spindle bar 44. To this end, drive rods 100, 101 are provided, longitudinally disposed for axial movement in the spindle bar in bores 103, 105, fashioned off-center in the spindle bar so as to avoid interference with the power drawbolt 24 and its actuating mechanism which passes through the center of the bar 44. The drive rods 100, 101 are aligned with bores 103′, 105′ in the facing head attachment when the latter is mounted in the spindle. Power for operating the spindle drive rods 100, 101 is obtained from the feed transmission supported within the headstock adjacent the rearward end of the spindle sleeve 45, and the transmission is effective to translate the drive rods 100, 101, which are alternately extensible into the bores 103′, 105′ of the facing head to abut the rod-like rearward ends 106, 107 of the control racks 108, 109, respectively. The racks 108, 109, respectively, mesh with intermediate pinions 111, 112, which, in turn, engage the main driving gear 79. The pinions 111, 112 are keyed or otherwise suitably mounted on shafts 115, 116, appropriately journaled in the attachment body 25. Through bores such as bore 118 are provided for assembly purposes, much in the same manner as bore 92 is provided for assembly of the main driving gear 79.

Viewing the drive transmission contained in the facing head now as a whole, it will be seen that axial movement of either drive rod 100 or drive rod 101 in the spindle will, via the racks 108, 109, cause rotation of the associated pinion 111 or 112 and accordingly rotation of the main drive gear 79, in one direction or the other. While the main drive gear 79 freely rides in the slot 81 and does not itself engage the tool slide 27, it is keyed to the shaft 77, as are gears 75 which engage the rack 70 on the runners 30 of the slide 27. Thus, rotation of the gear 79 imparts rotation to the gears 75 to drive the racks 70 to effect translation of the slide 27 in the slot 28 of the facing head. It will further be observed that there is a direct driving engagement throughout the transmission, and forward motion of the rod 100, for example, will impart clockwise motion to the gear 111 (as seen in FIG. 6) and counterclockwise rotation of the gears 79 and 75 to effect radial outward movement of the slide 27. Such motion has the effect of causing the gear 112 to rotate in a clockwise direction which will cause a rearward movement of the rack 109. It will now be seen that when the drive rod 100 has traversed its full path in the forward direction, the rack 109 is in effect "cocked," to return the slide 27 radially inwardly. In this manner a positive drive for the slide is provided which is controllable instantaneously by both rods, and, likewise, the relative position of the drive rods is determinative of the position of the tool slide at all times—an important feature when numerical controls are used.

It will now be appreciated that another objective of the invention is successfully realized, i.e., control completely through spindle engagement so that automatic tool changers may be used. Referring to FIG. 3, once the facing head tapered shank 23 has been received in the tapered socket 22 of the spindle, and the drawbolt 24 inserted and secured in the threaded bore 60, no further action is required to engage the drive means for the facing head. It is now possible, by means of the drive rods in the spindle, to exert complete control over the position and feed rate of the tool slide 27 at all times, and at all positions of the spindle, whether in rotation or not. A portion of FIG. 4 is cut away to show that drive rods 100, 101 abut the ends 106, 107 of the drive racks 108, 109 in the facing head, but are not otherwise joined thereto in any manner. In order to assure proper alignment of the spindle drive rods with the bores in the facing head a guide key (FIG. 4) 125 is provided on the spindle which is received in an associated keyway 127 (FIG. 7) on the facing heat attachment 20. These elements are so constructed that the attachment 20 may not be received in the spindle until they are aligned. Once aligned, the ends of the drive rods 100, 101 are receivable in the bores 103′ and 105′, respectively, always in abutting relation with the racks 108, 109, as previously described.

Because of the simplified driving arrangement described, predetermined movement of the drive rods 100, 101, which extend longitudinally along the spindle will result in controlled feed movement of the slide 27. Thus, the present invention provides a novel drive and control arrangement providing radial feed of a cutting tool carried by the facing head slide, which because of the advantageous use of axially driven push rods, may be disposed within the headstock rather than in another area of juncture between the facing head attachment and the spindle nose, and may make advantageous use of existing feed transmission elements already placed within the headstock proper for other purposes. Such a feed transmission is illustrated in its exemplary form schematically in FIG. 4 and in more complete structural detail in FIGS. 10 to 13.

Further, in keeping with the present invention, the feed transmission 140 is so constructed and arranged as to provide a plurality of axial feeds to the drive rods 100, 101. Thus, any such rate of feed may be applied to the tool (not shown) secured to the tool slide 27. Referring first to FIGS. 4 and 5, rotation of the spindle bar 44 is provided by means of the sleeve 45 driven by a ring gear 142. Variations in the spindle rotational speed are accomplished through a spindle drive 144 which may be any well known type. Since the drive rods 100, 101 are disposed off-center within the rotating spindle, it is contemplated to obtain power to translate the rods by a differential mechanism operating from rotating gears. Referring particularly to FIGS. 3, 3*a* and 4, this conversion of rotary drive to axial translation of the drive rods 100, 101 is accomplished as follows: The right-hand end of the drive rods 100, 101 extend into a pair of longitudinal slots 103″ and 105″ formed in the spindle to the rear of and connected with bores 103 and 105.

Each of the drive rods is coaxially aligned in end abutting relationship with a screw 147, threadably supported in a nut 149 which is fixed within the longitudinal slots 103″ and 105″. It will be seen that rotation of the screw 147 in the nut 149 will move the associated drive rod 100, 101 in the spindle. To take the end thrust, a thrust bearing is interposed between each screw and the associated drive rod with the rod having a neck-down portion 100′, which fits into a bore 147′ in the screw.

To rotate the screw 147, the latter is fixed to and adapted to be rotated by a spline shaft 152 which extends rearwardly from the screw and is slidably received to be rotatably driven by a pinion 153. A pair of pinions 153, one for each screw 147 and drive rods 100, 101, are carried for rotation with the spindle bar, being for this purpose carried on the right-hand end of the spindle sleeve 45. To mount the pinions 153, a bearing ring 154 is secured to the end of the sleeve and is provided with bores 155 to receive the pinions 153. In addition, the bearing ring supports a ring gear 156 via the pinion 153, which has internal teeth 157 meshing with the pinions 153, the ring gear 156 being rotatable about the spindle and the bearing ring 154 supporting the gear.

It will be seen from FIG. 4 that rotation of the ring gear 156 about the spindle bar 44 at a speed which is different from the speed at which the spindle itself is being driven, will rotate the pinions 153. Because the pinions 153 are splined to the shafts 152, the spline shafts 152 will be rotated as the pinions 153 are rotated, thus causing translation of the drive rods 100, 101, through the action of the nut 149 and screw 147. Furthermore, though the rods 100, 101 are translated, the pinions 153 remain in constant engagement with the ring gear 156 since the spline shafts 152 are axially translatable through the pinions 153, without physically displacing them. The splined connections between the pinions 153 and the shaft 152 also allows axial movement of the spindle bar 44 relative to sleeve 45 with uninterrupted drive to the facing head slide 27.

It will be appreciated, therefore, that desired variations in feed rate as a function of spindle speed may be expediently obtained by varying the rotational speed of the ring gear 156 with respect to the spindle bar. The present invention provides a novel arrangement for accomplishing this.

Thus, in order to provide the greatest versatility in using the facing head, a power transmission arrangement is provided which permits a large number of speed variations to be provided at the ring gear 156. To this end, a dual power input is provided, and integrated by a transmission system to provide a unitary variable output to the drive rods. Referring to FIG. 4 and FIGS. 11 and 12, a pickoff ring gear 160 is provided, and in this case, conveniently mounted adjacent the ring gear 156, but so mounted as to be nonrotatable with respect to the spindle bar 44. The gear 160 provides or picks off spindle speed to a gear 162, secured to a shaft 164, which mounts a pinion 166 near the other end thereof. The pinion 166 is in driving engagement with a gear 168, fixed to a shaft 169, which has an axially slidable gear 170 disposed thereon. As will hereinafter appear, the gear 170 is shiftable to form a portion of a drive arrangement for an auxiliary machine tool element. For the purpose of this portion of the description, however, the gear 170, is, as shown in dotted lines, engaged with a gear 172, integral with the carrier 172′ and forming a portion of a planetary gear train 173, and here driving a planet carrier 174.

The second power input of the dual input to the transmission 173 is provided by a variable drive 180 of a well-known construction, which may be manually or numerically controlled as part of the main machine transmission connecting to other machine elements. The transmission 173 may be conditioned, if desired, to provide an input to the transmission 173 as a function of the movement of another machine element. The variable drive connects to the transmission by means of an input shaft 182 and input bevel gear 183 to a bevel pinion 184, which drives a cross shaft 186, having a gear 188 attached thereto in driving relation. The gear 188 engages a planetary input pinion 190, attached directly to a shaft 192, which carries the sun gear 194 of the planetary transmission. By now providing a first input to the planetary differential transmission which is proportional to spindle rotation, and a second input which is variable as desired, a precisely controlled output may be derived due to the well-known planetary differential gear train principles, and transmitted to the ring gear 156. The sun gear 194 engages one of the set of planet pinions 196, each of this first set of planet pinions 196 being elongated so as to be in constant mesh with one of a second set of planet pinions 198 as indicated by the dashed line in FIG. 5. FIGURE 11, in order to show planet pinions 196, 198 of both sets, is a sectional view taken along bisecting planes as shown by lines 11—11 in FIG. 10. Each of the second set of planet pinions 198 engages an output gear 200, mounted to a shaft 202, which carries a gear 204 which, as it will be seen, engages the gear 156 about the spindle 44. The rotational speed of the planet pinions 196 is a function of the drive imparted to it through rotation of the planet carrier by gear 170 as a function of the rotational speed of the spindle and that imparted to it through the sun gear 194, driving one of its planet members. The transmission output through planet pinion 198 is, therefore, a combined function of spindle rotation and the precisely controlled variable drive 180.

It will be appreciated that when the drive to the ring gear 156 rotates the latter at the same speed as the spindle, no rotation of the rods 100, 101 is effected and, therefore, no translation of the cross slide 27 is provided. However, the present arrangement is such that by appropriate control of the variable drive 180, a higher rotational speed may be transmitted to the ring gear 156 than that at which the spindle bar 44 is turning and as a result, the gears 153 are caused to rotate thus effecting translation of the rods 100, 101 so as to drive the slide 27 in one direction or the other. It is, of course, merely a design consideration as to whether greater relative rotation of the gear 156 will effect movement on the slide 27 to the left or right.

As mentioned above, one problem in providing a facing head attachment for a numerically controlled machine tool involves determining at any time the precise position of the tool during operation of the facing head with respect to the workpiece. It is an attribute of the present invention that the precise position of the tool is determinable at all times, which is a further feature of the particular drive arrangement previously described.

It has been mentioned that the drive rods 100, 101 are so connected with the tool slide 27 that forward movement of one in its bore results in a proportionate rearward movement of the other. It is clear, therefore, that by determining the relative position of the racks 108, 109, the precise position of the tool slide may also be determined. It is a simple matter, then, to determine the location of the tool which is fitted, by means of an appropriate holder (not shown) into fixed receptacles 33, 35. Since drive rods 100, 101 are constantly in abutting relation with the drive racks 108, 109, the drive rods also move relative to one another in identical amounts. Accordingly, determination of the the relative position of the rods 100, 101 will provide the location of the tool on the tool slide 27. The relative position of the rods 100, 101 is, at all times, proportionate, through transmission 173, to the angular position of the power input shaft 182. Otherwise stated, the position of the drive rods is a function of spindle rotation and rotation of the shaft 182. This information, referring to FIG. 5, is received by a data box 210 connected to the shaft 182 so as to sense the angular position of the shaft at all times. The data box may be of any suitable electrical or mechanical construction, conveniently including one or more servomotors for determination of the position of the element for which the data box is designed, in this case the tool on the facing head attachment. This information is usable to permit the execution of tool movements between specified coordinates automatically by use of numerical control.

It is in keeping with the invention that the transmission 173, which is usable as described to effect the novel displacement of the tool slide of a facing head attachment, is also useful in providing a power input to other elements of the machine tool, which are not the specific concern of the present invention. Thus, in certain instances, it is desirable to translate the headstock, the table or saddle of the machine tool, as the case may be, at a rate which is related to spindle speed, as contrasted to a drive at distance per unit time. The invention contemplates one manner of accomplishing this end without the addition of other machine elements which would add to the expense and size of the tool. Thus, the gear 170, which is shiftable as noted hereinabove, is constantly rotating at a speed which is proportional to spindle speed. By shifting the gear 170 to the right, as seen in FIG. 5, it is engaged with the gear 190, and gears 188, 184, 183, and to shaft 182. A drive may, therefore, be imparted through the variable drive 80, which is a function of spindle speed, and ring gear 172 will be free to idle so that the drive through transmission 173 is effectively disengaged.

Actual shifting of the gear 170 may be accomplished automatically, or manually, and in the present instance may be effected by a piston 220 (FIG. 12), which is translatable in a cylinder 222, formed in the housing 224, about the transmission 140. A plug 226 is screwed into the end of the cylinder 222 and the latter is provided with a fluid passage 228 through which pressure fluid may be conveniently supplied. To shift the gear 170 from the piston 220, which is grooved at 230 and provided with a sealing O-ring 232, a piston rod 234 is employed which is also grooved at 236 and provided with a sealing ring 238 to prevent oil leakage through the reduced bore portion 240, which supports the piston rod 234 for reciprocation. The outer end of the rod 234 is reduced and threaded as at 242 and a shifting bar 244, which has a hole 246 in one end thereof is secured on the reduced portion 242 by a nut 248. The opposite end of the bar 244, 250 is bifurcated and engages a shaft 252 between two supporting washers 254, 256, all of which are held in place by a nut 258. The rod 252 is reciprocable in a bore 257, concentrically disposed in the shaft 169 which carries gears 168 and a sliding gear 170. The external portion of the shaft 169 in the vicinity of the gear 170 is splined as at 259 so as to constantly engage the gear 170 for rotation while permitting actual translation thereof on the shaft. The shaft 169 is also slotted at 261 (FIG. 12) and the gear 170 is pinned by means of transverse pin 263 to the reciprocable shaft 252. Thus, the application of the appropriate hydraulic pressure at the face of the piston 220 through aperture 228 in the cylinder 222 will raise the piston as seen in FIG. 12, and accordingly move the member 244 and the shaft 252 (to the right) to bring the gear 170 out of driving engagement with the planet carrier gear 172. In the present instance, a return compression spring 267 is provided in the cylinder 222 and thus, in the usual position, the sliding gear 170 is in engagement with the gear 172, attached to the planet carrier to permit a feed drive to the slide 27.

In order that the operator will, at all times, be aware of the position of the sliding gear 170 and thus the condition of the transmission for drive, referring to FIGS. 12 and 13, sensing switches 270 and 272 are provided. A cam 274 is mounted in any convenient manner to the piston rod 234, as here indicated in FIG. 12, by a C clip. The cam 274 engages a follower 277 on the microswitch 272, thereby closing and opening the same as the rod 234 is reciprocated. In a like manner, a follower 280 is provided on switch 270 and is adapted to be operated by an arm 274' connected for movement with the shaft 252. By providing the combination of switches 270, 272, the position of the gear 170 may be fed into an automatic control system, or alternatively operate an indicator light to demonstrate to the operator the position of his transmission, or both.

I claim:

1. In a machine tool; the combination of a rotatable and translatable machine tool spindle, a facing head for attachment on the free end of said spindle, drive means for rotating said spindle, feed means for translating said spindle, and drive means for operating said facing head to radially position said tool holder while said spindle is rotated including longitudinally movable drive rods disposed in said spindle for axial extension therefrom into engagement with said facing head, said drive rods having threaded portions of opposite hand and splined portions, a nut fixed in the spindle and engaging the threaded portion of each drive rod such that rotation of said drive rods in the same direction causes axial movement thereof in the opposite direction, a pinion mounted on said splined portion of each rod so that the latter is slidable through said pinion while the latter is supported for rotation about the axis of said drive rod simultaneously with rotation of said spindle, means for rotating said pinions including a ring gear surrounding said spindle and meshing with said pinions being rotatable relative to said spindle so as to rotate said pinions together in one direction or the other according to the speed of said ring gear relative to the speed of said spindle.

2. A facing head for attachment to the spindle of a machine tool, comprising a body, a radially movable tool slide on said body, means for radially positioning said tool slide on said facing head including a rack on said tool slide, gear means engageable with said rack, and a pair of push rods having a rack portion connected with said gear means to rotate the same when said rods are axially advanced and returned by means extending from a spindle, the axial advance for a distance of either of said push rods being effective to return the other rod the same distance.

3. A facing head for attachment to the spindle of a machine tool comprising, in combination, a body adapted to be secured on a spindle, a tool slide reciprocable radially on said body, drive means for said slide supported in said body and adapted to be actuated by external power means extending into said body, said drive means including a pair of parallel, axially displaceable push rods for moving said tool slide outwardly upon axial advance of one rod and inwardly upon axial advance of the other rod, means connecting said rods so that advancing either of said rods for a distance returns the other the same distance, and means on said body defining parallel bores for said push rods adapted to receive external power means extending into said bores for displacing said rods.

4. A facing head according to claim 3 including means carried by said facing head body for cooperation with means on a spindle upon attachment thereto to align said bores in said body with means on said spindle extending into said bores for displacing said push rods.

5. In a machine tool having a headstock: the combination of a tool head including a socket for receiving a power drawbolt, a tool slide, and actuating means connected to said slide; and a machine tool spindle supported for powered rotation and axial translation in said headstock, said spindle including a power drawbolt mounted along the axis of said spindle and engageable in said tool head socket for attaching said tool head to the free end of said spindle, and drive means for said tool slide movably mounted within said spindle offset from the axis thereof for cooperation with said actuating means in said tool head, said drive means in said spindle being engageable with said actuating means in said head upon attachment of the head by said drawbolt to said spindle, for moving said tool slide radially simultaneously with rotation and axial translation of the spindle.

6. In a machine tool according to claim 5, said drive means in said spindle comprising a pair of drive members disposed concentric with the power drawbolt along the axis of said spindle to be extended and retracted longitudinally from the free end thereof.

7. In a machine tool according to claim 6, said actuating means for said tool slide including a pair of drive rods engageable with and operated responsive to extension and retraction of said drive members in said spindle.

No references cited.

WILLIAM W. DYER, Jr., *Primary Examiner.*

LEONIDAS VLACHOS, *Examiner.*